United States Patent
Shang et al.

(10) Patent No.: US 11,748,293 B2
(45) Date of Patent: Sep. 5, 2023

(54) METHOD OF AUTOMATIC IDENTIFICATION AND PROTECTION OF CORRECT PCIE CONFIGURATION OF A SERVER AND SERVER APPLYING THE METHOD

(71) Applicant: Fulian Precision Electronics (Tianjin) Co., LTD., Tianjin (CN)

(72) Inventors: Hou-Fei Shang, Tianjin (CN); Li-Wen Guo, Shenzhen (CN); Xiao-Long Zhou, Tianjin (CN); Zhen-Zhu Zhang, Shenzhen (CN); Ke-Feng You, Shenzhen (CN); Jian-Fei Wang, Tianjin (CN); Miao Zhang, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 17/843,064

(22) Filed: Jun. 17, 2022

(65) Prior Publication Data
US 2023/0147267 A1 May 11, 2023

(30) Foreign Application Priority Data
Nov. 11, 2021 (CN) .......................... 202111338552.X

(51) Int. Cl.
*G06F 13/42* (2006.01)
*G06F 13/40* (2006.01)

(52) U.S. Cl.
CPC ........ *G06F 13/4221* (2013.01); *G06F 13/409* (2013.01); *G06F 13/4045* (2013.01); *G06F 13/4068* (2013.01)

(58) Field of Classification Search
CPC ............. G06F 13/4221; G06F 13/4045; G06F 13/4068; G06F 13/409
See application file for complete search history.

(56) References Cited

U.S. PATENT DOCUMENTS

| | | | |
|---|---|---|---|
| 2004/0133726 A1* | 7/2004 | Kurita | G06K 7/0047 710/301 |
| 2018/0167223 A1* | 6/2018 | Pratap | H04L 12/10 |
| 2022/0097544 A1* | 3/2022 | Tanaami | B60L 53/16 |
| 2023/0104392 A1* | 4/2023 | Zhang | H01R 13/713 136/251 |

* cited by examiner

*Primary Examiner* — Henry Tsai
*Assistant Examiner* — John B Roche
(74) *Attorney, Agent, or Firm* — ScienBiziP, P.C.

(57) ABSTRACT

A method of automatic identification of PCIe configuration of a server and preventing operation if each slimline connector connected with a PCIe device is found connected to an incorrect slot of a mother board utilizes a combination of first and second signals of two null interfaces of the first connector as that ID signal and a combination of third and fourth signals of the two interfaces of a second connector as that ID signal. The CPLD receiving the ID signals detects whether the first and second slimline connectors are in their specified and correct slots. Powering on of computer is not permitted if incorrect connection is found, and a warning prompt is generated. A PCIe channel width for each slimline is automatically configured if no incorrect connection is found. A server applying the method is also disclosed.

12 Claims, 3 Drawing Sheets

US 11,748,293 B2

METHOD OF AUTOMATIC IDENTIFICATION AND PROTECTION OF CORRECT PCIE CONFIGURATION OF A SERVER AND SERVER APPLYING THE METHOD

FIELD

The subject matter herein generally relates to computing, particularly a method of automatic identification and protection of correct PCIe configuration of a server and a server applying the method.

BACKGROUND

In a traditional server system, a Peripheral Component Interconnect Express (PCIe) device connects with a mother board of a server through a slimline connector, and connects with different root ports of a central processing unit (CPU). Each slimline connector can be connected with an expansion card, with a backplane of a hard disk, or with other PCIe device. However, traditional design of server system does not automatically identify different slimline connectors which are connected with different root ports. The system further fails to configurate different widths of channels to the different PCIe devices. Therefore, the positions of the backplane of the hard disk connected with different PCIe devices are fixed, and the width of the channel of each PCIe device is also fixed.

It is hard to distinguish between different slimline connectors, connection to the wrong slimline connector can happen, and if so the width of the channel may not be matched. A short circuit is also possible when connecting a power of the mother board with a ground terminal of the wrong PCIe device, the backplane of the hard disk or the expansion card, or even the PCIe device, may suffer damage.

Thus, there is room for improvement in the art.

BRIEF DESCRIPTION OF THE FIGURES

Implementations of the present disclosure will now be described, by way of example only, with reference to the attached figures.

DETAILED DESCRIPTION

Figure 1:
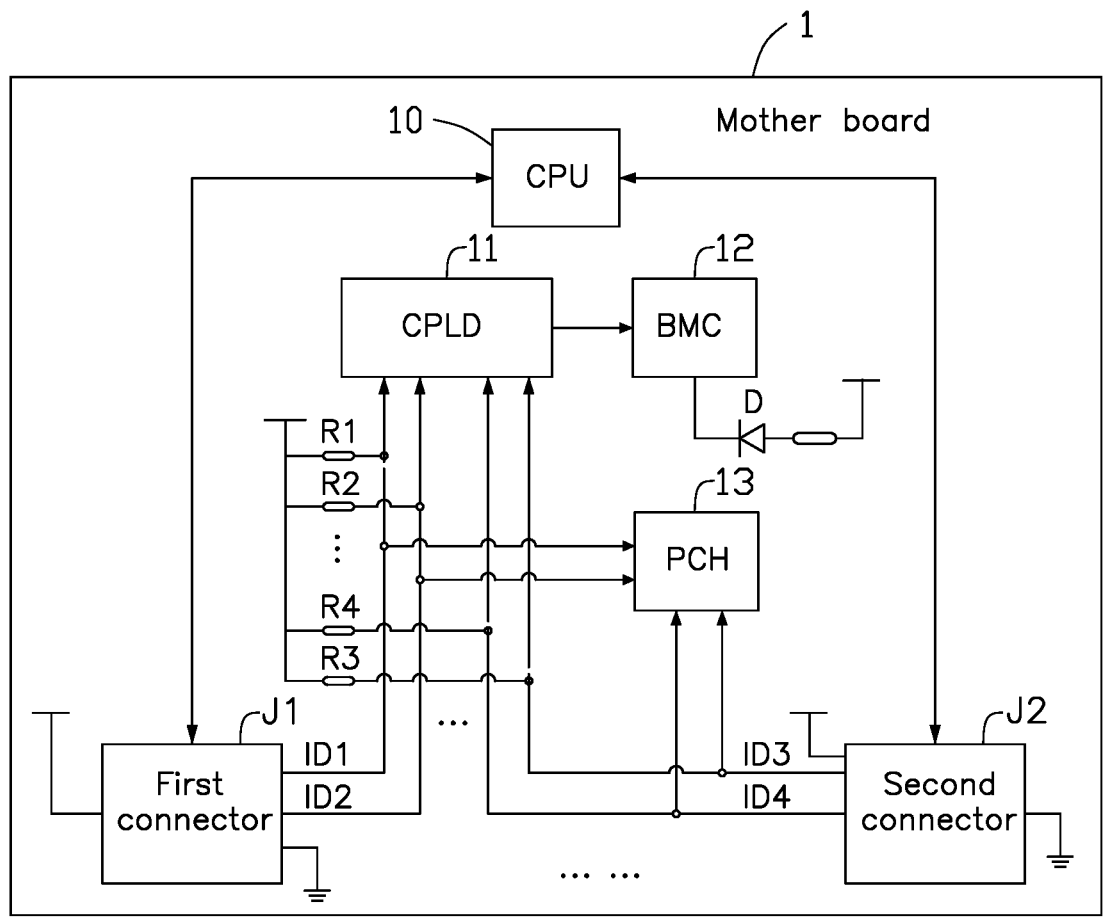
FIG. 1 is a circuit diagram illustrating an embodiment of a server according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

FIG. 1 shows a circuit diagram of a server 100. In some embodiments, the circuit of the server 100 can be a mother board circuit of a server system, and the server system can be a computer system.

The server 100 can include a mother board 1, a central processing unit (CPU) 10, a complex programming logic device (CPLD) 11, a baseboard management controller (BMC) 12, and a platform controller hub (PCH) 13.

Figure 2:
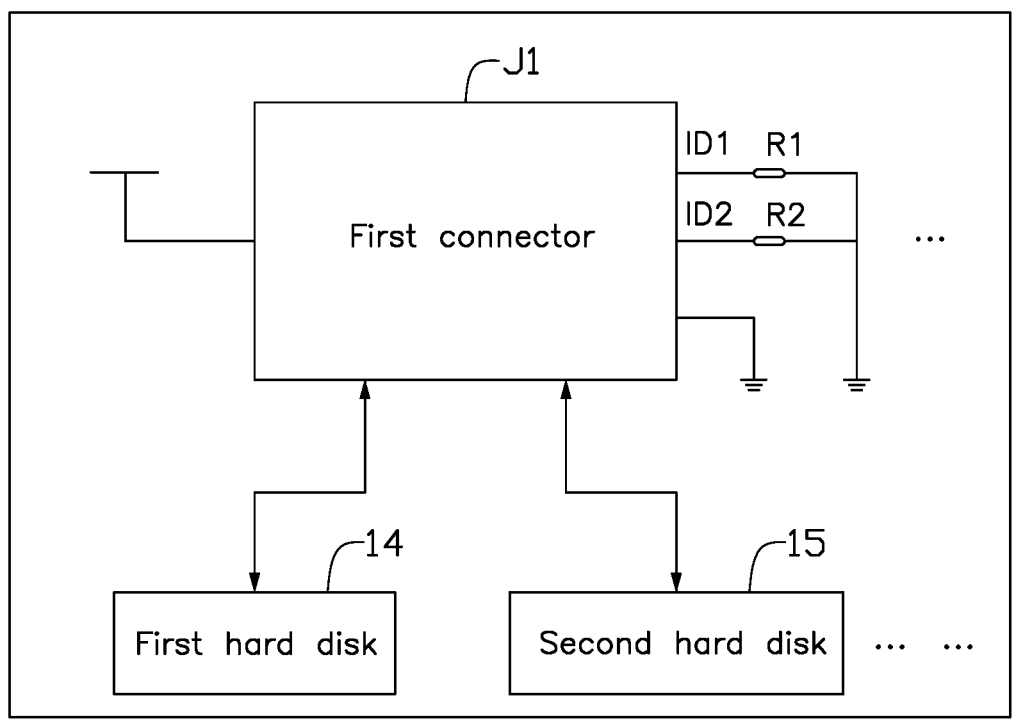
FIG. 2 is a circuit diagram illustrating an embodiment of different connectors being connected with different devices according to the present disclosure.
Figure 2:
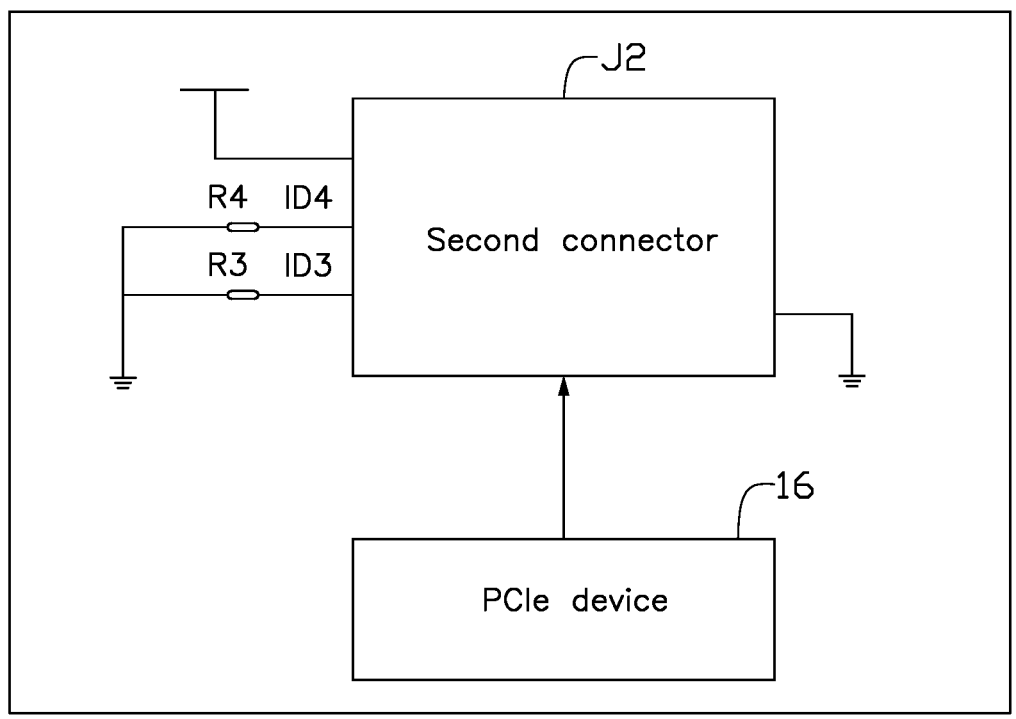

The server 100 further includes several connectors, for example, a first connector J1 and a second connector J2. The first connector J1 and the second connector J2 can be same type or a same standard of slimline connector, and the first connector J1 and the second connector J2 can connect with different types of devices through different types of slimline. As shown in FIG. 2, both the first connector J1 and the second connector J2 are configured to connect with a first hard disk 14, a second hard disk 15, or a Peripheral Component Interconnect Express (PCIe) device 16.

In some embodiments, the first connector J1, the second connector J2, the CPU 10, the CPLD 11, the BMC 12, the PCH 13, and other electronic components in the server 100 (for example, resistors, cables) are arranged on the mother board 1.

The first connector J1 includes two null interfaces for receiving a first signal ID1 and a second signal ID2. The second connector J2 includes two null interfaces for receiving a third signal ID3 and a fourth signal ID4. In some embodiments, the first to fourth signals ID1-ID4 can be identification (ID) signals. In some embodiments, the number of slimline connectors in the server system can be less or more, and the received signals also can be increased or decreased accordingly.

The first connector J1 can include a first slimline. The second connector J2 can include a second slimline. In some embodiments, the combination of the first signal ID1 and the second signal ID2 can be defined as a fifth signal serving as an ID of the first slimline. By identifying the first signal ID1 and the second signal ID2, the fifth signal is identified. The combination of the third signal ID3 and the fourth signal ID4 can be defined as a sixth signal serving as an ID of the second slimline. By identifying the third signal ID3 and the fourth signal ID4, the sixth signal is identified.

The first to fourth signals ID1-ID4 are provided to a first terminals of first to fourth resistors R1-R4 respectively. Second terminals of the first to fourth resistors R1-R4 are grounded. In some embodiments, the resistance of each of the first to fourth resistor R1-R4 is 4.7 KΩ.

In some embodiments, when the ID signal of the first slimline needs to be defined by the first signal ID1, an external signal can pull the first signal ID1 to be high level through the first resistor R1. When the ID signal of the first slimline does not need to be defined by the first signal ID1, another external signal can pull the first signal ID1 to be low level through the first resistor R1. When the ID signal of the first slimline needs to be defined by the second signal ID2, an external signal can pull the second signal ID2 to be high level through the second resistor R2. When the ID signal of the first slimline does not need to be defined by the second signal ID2, another external signal can pull the second signal ID2 to be low level through the second resistor R2. When the ID signal of the second slimline needs to be defined by the third signal ID3, an external signal can pull the third signal ID3 to be high level through the third resistor R3. When the ID signal of the second slimline does not need to be defined by the third signal ID3, another external signal can pull the third signal ID3 to be low level through the third resistor R3. When the ID signal of the second slimline needs to be defined by the fourth signal ID4, an external signal can pull the fourth signal ID4 to be high level through the fourth resistor R4 and when the ID signal of the second slimline does not need to be defined by the fourth signal ID4, another external signal can pull the fourth signal ID4 to be low level through the fourth resistor R4.

The first connector J1 and the second connector J2 are both electrically connected with the CPU 10. The CPU 10 can connect with different types of other devices through the first connector J1 and the second connector J2.

The ID signals of the first slimline and the second slimline are provided to the CPLD 11. The CPLD 11 obtains the fifth signal and the sixth signal based on the first to fourth signals ID1-ID4, these serving as the ID signals of the first slimline and the second slimline. After obtaining the ID signals of the first slimline and the second slimline, the CPLD 11 detects whether the first slimline and the second slimline are connected with the specified and correct slots of the mother board 1 using an internal logic resource.

The CPLD 11 is electrically connected with the BMC 12. The BMC 12 is further electrically connected with a light emitting diode D. The light emitting diode D is used as an indicator. When the CPLD 11 detects that any of the first slimline and the second slimline is connected with an incorrect slot before the server system is powered on, the CPLD 11 outputs a first information and the ID signal of the slimline connected with the incorrect slot to the BMC 12, and the server system is not permitted to power on. The first information is a warning prompt. When the BMC 12 receives the first information, the light emitting diode D emits light for prompting users. In some embodiments, the BMC 12 further uploads the first information to a BMC website, and the users can obtain the first information from the BMC website, for discovering the error. Therefore, before the server system is powered on, an incorrect connection of the slimline can be discovered, and the problems such as a short circuit in or a burnout of the mother board 1 and the device caused by an incorrect connection of the slimline can be avoided.

When each slimline is correctly connected with the specified slot of the mother board 1, the server system can be normally started, and a basic input output system (BIOS) of the server system can identify the types of the devices connected with the CPU 10 through the first connector J1 and the second connector J2 based on the fifth signal and the sixth signal. The BIOS further automatically configures PCIe channel widths based on the identified types of the devices.

In some embodiments, the first to fourth signals ID1-ID4 are transmitted to the PCH 13. The PCH 13 configures the PCIe channel widths to the devices connected with the CPU 10.

Figure 3:
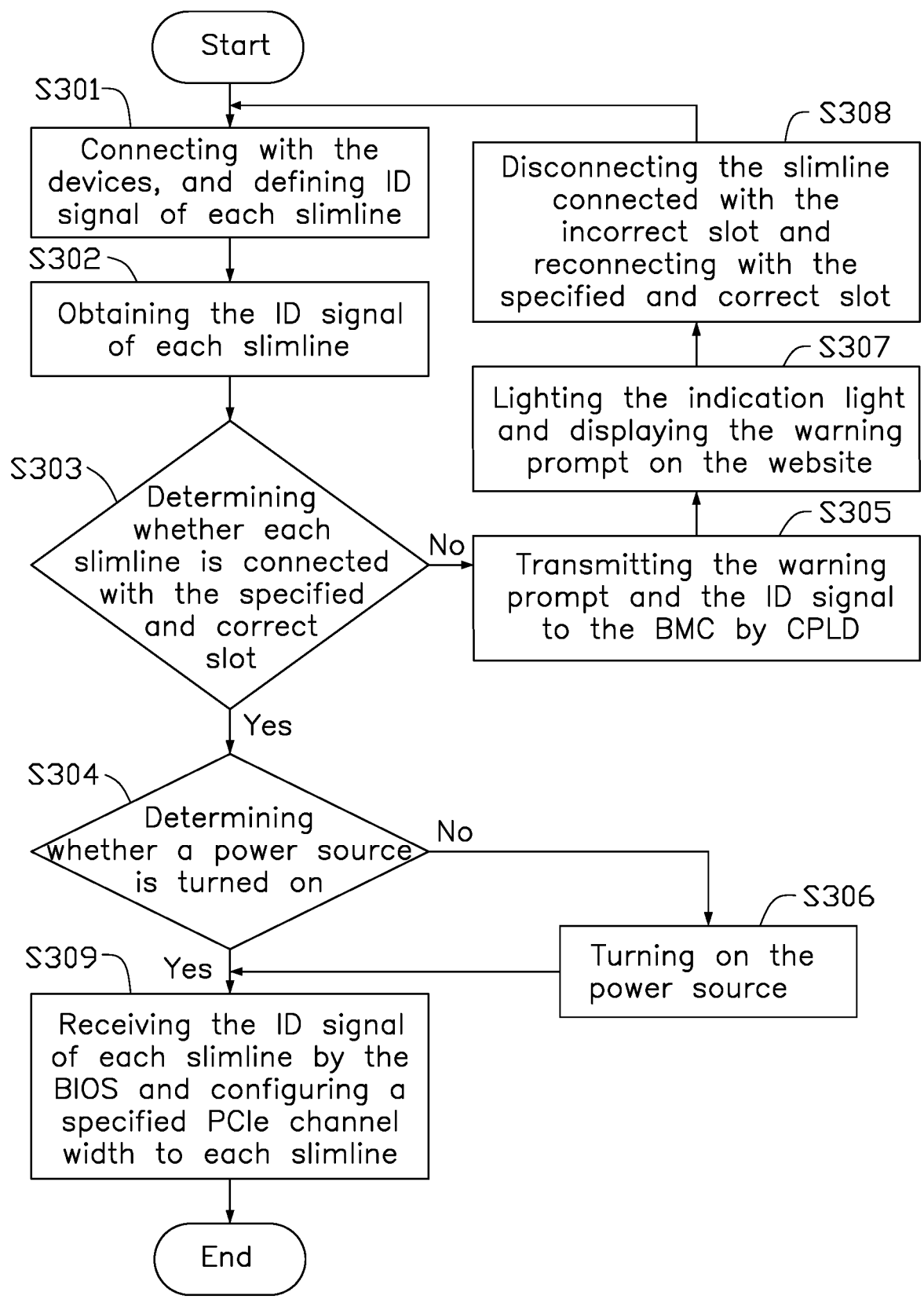
FIG. 3 is a flowchart illustrating an embodiment of method of automatic identification of the PCIe configuration of a server according to the present disclosure.

FIG. 3 shows a method of automatic identification of the PCIe configuration of a server 100. The server 100 can include a mother board 1, a CPU 10, a CPLD 11, a BMC 12, and a PCH 13. As shown in FIG. 3, the method includes following steps, these steps may be re-ordered:

In block S301, the devices are connected, and the ID signal of each slimline are defined and outputted.

The server 100 further includes several connectors, for example, a first connector J1 and a second connector J2. The first connector J1 and the second connector J2 can be same type or same standard of slimline connector, and the first connector J1 and the second connector J2 can connect with different types of the devices through different types of slimline. The first connector J1 includes two null interfaces for receiving a first signal ID1 and a second signal ID2. The second connector J2 includes two null interfaces for receiving a third signal ID3 and a further signal ID4. In some embodiments, the first to fourth signals ID1-ID4 can be ID signals.

In some embodiments, the combination of the first signal ID1 and the second signal ID2 is defined as a fifth signal severing as an ID of the first slimline. By identifying the first signal ID1 and the second signal ID2, the fifth signal is identified. The combination of the third signal ID3 and the fourth signal ID4 defines as a sixth signal severing as an ID of the second slimline. By identifying the third signal ID3 and the fourth signal ID4, the sixth signal is identified.

After defining the ID signal of the first slimline of the first connector J1 and the ID signal of the second slimline of the second connector J2, the block S302 is executed.

In block S302, the CPLD 11 obtains the ID signal of each slimline.

The ID signals of the first slimline and the second slimline are transmitted to the CPLD 11, the CPLD 11 obtains the fifth signal and the sixth signal according to the first to fourth signals ID1-ID4 as the ID signals of the first slimline and the second slimline, and the block S303 is executed.

In block S303, determining whether each slimline is connected with the specified and correct slot.

After the CPLD 11 obtains the ID signal of the first slimline and the ID signal of the second slimline, the CPLD 11 detects whether the first slimline and the second slimline are connected with the specified and correct slots of the mother board 1 using an internal logic resource. When each slimline is connected with the specified and correct slot of the mother board 1, the block S304 is executed. When any one of the first slimline and the second slimline is connected with an incorrect slot, the block S305 is executed.

In block S304, determining whether a power source is turned on.

When any one of the first slimline and the second slimline is connected with the incorrect slot, the server system determines whether the power source is turned on. When the power source is turned on, the block S309 is executed. When the power source is turned off, the block S306 is executed.

In block S305, the CPLD 11 transmits the warning prompt and the ID signal to the BMC 12.

When any one of the first slimline and the second slimline is connected with the incorrect slot, the signals of the slimline connected with the incorrect slot is transmitted to the CPLD 11, and the CPLD 11 transmits the warning prompt and the ID signal of the slimline connected with the incorrect slot to the BMC 12, and does not permit the server system to power on.

In block S306, the power source is turned on.

When the server system detects the power source is in a turned of state, the power source is turned on, and the block S309 is executed.

In block S307, the indication light is lighted and the warning prompt is displayed on the website.

The CPLD 11 is electrically connected with the BMC 12. The BMC 12 are further electrically connected with a light emitting diode D. The light emitting diode D is used as an indicator. When the CPLD 11 detects that any of the first slimline and the second slimline is connected with the incorrect slot before the server system is powered on, the CPLD 11 outputs a first information and the ID signal of the slimline connected with the incorrect slot to the BMC 12, and the server system is not permitted to power on. The first information is a warning prompt. When the BMC 12 receives the first information, the light emitting diode D emits light for prompting users. In some embodiments, the BMC 12 further uploads the first information to a BMC website, and the users can obtain the first information from the BMC website, for discovering the error. The block S308 is executed.

In block S308, the slimline connected with the incorrect slot is disconnected with the incorrect slot and is reconnected with the specified and correct slot.

According the warning prompt, the slimline connected with the incorrect slot is discovered. The slimline which is wrongly connected is disconnected from the incorrect slot and is reconnected to the specified and correct slot. The block S301 is executed.

In block S309, the BIOS receives the ID signal of each slimline and configures a specified PCIe channel width to each slimline.

When each slimline is correctly connected with the specified slot, the server system normally starts, and the BIOS of the server system identify the types of the devices connected with the CPU 10 through the first connector J1 and the second connector J2 based on the fifth signal and the sixth signal. The BIOS further automatically configure PCIe channel widths based on the identified types of the devices.

Based on the method of automatic identification of PCIe configuration of a server, the slimline connector The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of automatic identification of PCIe configuration of a server, wherein the server in a server system comprises a mother board, a first connector, a second connector, and a complex programming logic device (CPLD); wherein the method comprises:
    defining a combination of a first signal and a second signal received by two interfaces of the first connector as an ID signal of a first slimline, and a combination of a third signal and a fourth signal of two interfaces received by the second connector as an ID signal of a second slimline;
    obtaining the ID signals of the first slimline and the second slimline by the CPLD according to the first to fourth signals, and detecting whether the first slimline and the second slimline are correctly connected with specified slots of the mother board respectively;
    forbidding the server system to be powered on when any one of the first slimline and the second slimline is connected with an incorrect slot and generating a warning prompt; and
    normally starting the server system and automatically configuring a PCIe channel width to each slimline when both of the first slimline and the second slimline are connected with the specified slots respectively.

2. The method of claim 1, wherein the first signal, the second signal, the third signal, and the fourth signal are transmitted to the CPLD;
    the CPLD obtains the ID signals of the first slimline and the second slimline based on the received first to fourth signals; and
    the CPLD detects whether the first slimline and the second slimline are correctly connected with specified slots of the mother board using an internal logic resource thereof.

3. The method of claim 2, wherein when the CPLD detects that one of the first slimline and the second slimline is connected with the incorrect slot before the server system being powered on, the CPLD transmits a first information as the warning prompt and the ID signal of the slimline connected with the incorrect slot to a baseboard management controller (BMC) of the server, the server system is not permitted to power on;
    the BMC is electrically connected with a light emitting diode; and
    the BMC controls the light emitting diode to be lit when receiving the first information.

4. The method of claim 2, wherein when both of the first slimline and the second slimline are correctly connected with the corresponding specified slots, a basic input output system (BIOS) identifies types of the devices connected with the devices connected with the first connector and the second connector based on the ID signals of the first slimline and the second slimline; and the BIOS further automatically configures the PCIe channel widths based on the identified types of the devices.

5. The method of claim 3, wherein when the BMC receives the first information, the BMC transmits the first information to a BMC website.

6. A server used in a server system, wherein the server comprises a mother board, a first connector, a second connector, and a complex programming logic device (CPLD);
    a combination of a first signal and a second signal received by two interfaces of the first connector is defined as an ID signal of a first slimline,
    a combination of a third signal and a fourth signal received by two interfaces of the second connector is defined as an ID signal of a second slimline;
    the CPLD obtains the ID signals of the first slimline and the second slimline according to the first to fourth signals;
    the CPLD detects whether the first slimline and the second slimline are correctly connected with specified slots of the mother board respectively;
    when any one of the first slimline and the second slimline is connected with an incorrect slot, a warming prompt is generated and the server system is not permitted to power on; and
    the server system normally starts and a PCIe channel width to each slimline is automatically configured when both of the first slimline and the second slimline are connected with the specified slots respectively.

7. The server of claim 6, wherein the first signal, the second signal, the third signal, and the fourth signal are transmitted to the CPLD;
- the CPLD obtains the ID signals of the first slimline and the second slimline based on the received first to fourth signals; and
- the CPLD detects whether the first slimline and the second slimline are correctly connected with specified slots of the mother board using an internal logic resource thereof.

8. The server of claim 7, wherein when the CPLD detects that one of the first slimline and the second slimline is connected with the incorrect slot before the server system being powered on, the CPLD transmits a first information as the warning prompt and the ID signal of the slimline connected with the incorrect slot to a baseboard management controller (BMC) of the server;
- the server system is not permitted to power on; the BMC is electrically connected with a light emitting diode; and
- the BMC controls the light emitting diode to be lit when receiving the first information.

9. The server of claim 6, wherein when both of the first slimline and the second slimline are correctly connected with the corresponding specified slots, a basic input output system (BIOS) identifies types of the devices connected with the devices connected with the first connector and the second connector based on the ID signals of the first slimline and the second slimline; and the BIOS further automatically configures the PCIe channel widths based on the identified types of the devices.

10. The server of claim 7, wherein when the BMC receives the first information, the BMC transmits the first information to a BMC website.

11. The server of claim 6, wherein the first slimline inserted in the first connector and the second slimline inserted in the second connector are same type; the first and second connectors are connected with a central processing unit (CPU); and the CPU connects with different devices through the first and second connectors.

12. The server of claim 11, wherein the first to fourth signals are transmitted to platform controller hub (PCH) of the server; and the PCH configures the PCIe channel widths to the devices connected with the first and second connectors.

* * * * *